(12) United States Patent
Cho et al.

(10) Patent No.: US 8,603,936 B2
(45) Date of Patent: Dec. 10, 2013

(54) VISIBLE LIGHT-RESPONSIVE PHOTOCATALYST COMPOSITION CONTAINING TUNGSTEN-BASED OXIDES AND METHOD OF PRODUCING THE SAME

(75) Inventors: In Sun Cho, Namyangju-si (KR); Sang Wook Lee, Seoul (KR); Jun Hong Noh, Seoul (KR); Shin Tae Bae, Seoul (KR); Dong Wook Kim, Seongnam-si (KR); Chin Moo Cho, Seoul (KR); Chae Hyun Kwak, Bucheon-si (KR); Tae Hoon Noh, Seoul (KR); Duk Kyu Lee, Seoul (KR); Kug Sun Hong, Seoul (KR)

(73) Assignee: Seoul National University R&DB Foundation, Seoul (KR)

( * ) Notice: Subject to any disclaimer, the term of this patent is extended or adjusted under 35 U.S.C. 154(b) by 377 days.

(21) Appl. No.: 12/055,620

(22) Filed: Mar. 26, 2008

(65) Prior Publication Data
US 2009/0192032 A1    Jul. 30, 2009

(30) Foreign Application Priority Data
Jan. 29, 2008    (KR) .................. 10-2008-0009265

(51) Int. Cl.
    *B01J 23/00*    (2006.01)
(52) U.S. Cl.
    USPC ........................................... 502/313
(58) Field of Classification Search
    None
    See application file for complete search history.

(56) References Cited

U.S. PATENT DOCUMENTS

| 5,595,813 | A  | * | 1/1997  | Ogawa et al. ............... 428/212 |
| 6,277,346 | B1 | * | 8/2001  | Murasawa et al. .......... 502/350 |
| 6,730,630 | B2 | * | 5/2004  | Okusako et al. ............ 502/350 |
| 7,625,835 | B2 | * | 12/2009 | Li et al. ..................... 502/216 |
| 2006/0116279 | A1 | * | 6/2006  | Kogoi et al. ................ 502/103 |
| 2006/0150818 | A1 | * | 7/2006  | Okamoto et al. ............ 96/223 |

OTHER PUBLICATIONS

Baeck et al, combinatoiral eletrochemical syntheis and characterization of tungsten-based mixed metal oxides, J. Comb. Chme. 2002, 4, pp. 563-568.*

* cited by examiner

*Primary Examiner* — Melvin C Mayes
*Assistant Examiner* — Stefanie Cohen
(74) *Attorney, Agent, or Firm* — The Webb Law Firm

(57) ABSTRACT

Disclosed herein is a light-responsive photocatalyst composition, which is a composite oxide semiconductor containing tungsten, and which can efficiently absorb visible light emitted from the sun and light emitted from interior lamps, such as fluorescent lamps, etc., and a method of preparing the light-responsive photocatalyst composition. The visible light-responsive photocatalyst composition can decompose volatile organic compounds or harmful organic matter causing sick house syndrome, even indoors, because it can be activated by visible light outdoors and can respond to light emitted from interior lamps, such as fluorescent lamps, etc.

1 Claim, 4 Drawing Sheets

VISIBLE LIGHT-RESPONSIVE PHOTOCATALYST COMPOSITION CONTAINING TUNGSTEN-BASED OXIDES AND METHOD OF PRODUCING THE SAME

BACKGROUND OF THE INVENTION

1. Field of the Invention

The present invention relates to a light-responsive photocatalyst composition, which is a composite oxide semiconductor containing tungsten, and which can efficiently absorb visible light emitted from the sun and light emitted from interior lamps, such as fluorescent lamps, etc., and to a method of producing the same.

2. Description of the Related Art

A very large amount of solar energy, which is enough to be used for 30 years is by the entire population of the world, is radiated on the earth every day. Therefore, efforts to efficiently use visible light, which accounts for the majority of solar radiation, have attracted considerable attention for a long time.

Meanwhile, environmental problems, which are negative effects caused by the rapid growth of the economy in the $20^{th}$ century, are becoming more serious day by day. Particularly, various harmful materials, such as waste dyes, phenols, acetaldehydes, and the like, cause many problems. Since such harmful materials threaten people's comfortable lives, it is required to develop technologies for efficiently removing harmful materials as well as preventing them from being generated. Among methods of removing harmful materials, methods of removing harmful materials using a catalyst are well known and semi-permanently used. In particular, methods of decomposing harmful materials using a photocatalyst, in which the harmful materials are removed using only solar light, without using other kinds of energy, have been researched as a method of decomposing harmful materials using clean energy. However, most research has been conducted on photocatalysts using only ultraviolet rays of solar light. Since ultraviolet rays account for only 4% of the total amount of solar radiation, the fact that photocatalysts use only ultraviolet rays represents a very inefficient use of solar light.

A photocatalyst is a material for accelerating an oxidation-reduction reaction between reactants by absorbing light having an energy greater than a band gap energy, forming electrons and holes, dispersing the electrons and holes into the surface photocatalyst particles, and thus allowing the dispersed electrons and holes to participate in the oxidation-reduction reaction therebetween.

As application examples, methods of decomposing organic matter, such as agricultural chemicals, bad-smelling substances, etc., in water or air and methods of self-cleaning the surface of a solid coated with a photocatalyst, using the electrons and holes formed by such a photocatalytic reaction, are proposed, but these methods are mostly conducted using titanium dioxide ($TiO_2$) Since titanium dioxide ($TiO_2$) has a band gap energy of 3.2 eV, it is active only in the radiation of ultraviolet rays having a wavelength of less than 400 nm. For this reason, currently, titanium dioxide ($TiO_2$) is limitedly applied to outdoor lamps or ultraviolet ray lamps.

Therefore, when photocatalysts responsive to visible light, which accounts for 46% of solar light, are developed, they will be able to use solar light at high efficiency, and will be able to be used indoors as well as outdoors because they can respond to light emitted from fluorescent lamps indoors, where solar light is unattainable.

That is, in order to remove harmful materials, photocatalysts using clean and inexhaustible solar light are attracting attention. However, among the photocatalysts, since titanium dioxide ($TiO_2$), which has been known to be the most effective to date, absorbs only the ultraviolet rays, having short wavelengths, of solar light, it is keenly required to develop visible light-responsive photocatalyst compositions that can absorb the visible light in solar radiation.

SUMMARY OF THE INVENTION

Accordingly, the present invention has been made keeping in mind the above problems occurring in the prior art, and the present invention provides a visible light-responsive photocatalyst composition that can decompose volatile organic compounds or harmful organic matter, which cause sick house syndrome, even indoors, because it can be activated by visible light outdoors and can respond to light emitted from interior lamps, such as fluorescent lamps, etc.

Further, the present invention provides a method of producing a visible light-responsive photocatalyst composition that can be activated by visible light and fluorescent light.

Furthermore, the present invention provides a visible light-responsive photocatalyst composition that is chemically stable, does not change before or after a photocatalytic reaction, and can be effectively used to decompose harmful liquid or gaseous materials, and a method of producing the photocatalyst composition.

A first embodiment of the present invention provides a visible light-responsive photocatalyst composition, comprising a compound represented by Formula 1 below:

$$(A_{1-x}A'_x)WO_4 \tag{1}$$

wherein A and A' are each independently selected from among transition to metals and alkaline earth metals, and x is $0 \le x \le 0.5$.

In the first embodiment, the transition metal may include Cu, Ni, Co, Fe and Mn, and the alkaline earth metal may include Mg and Zn.

In the first embodiment, the compound represented by Formula 1 above may have a band gap energy of 3.0 eV or less.

The visible light-responsive photocatalyst composition according to the first embodiment of the present invention may further include one or more compounds selected from among NiOx, Pt and $RuO_2$ such that the amount thereof ranges from 0.1 to 5 wt %, based the amount of the compound represented by Formula 1 above.

A second embodiment of the present invention provides a method of producing a visible light-responsive photocatalyst composition, comprising a process of preparing a compound represented by Formula 1 below, the process comprising: mixing a transition metal oxide and an alkaline earth metal oxide with a tungsten oxide such that the molar ratio of (A+A'):W is 1~3:1~3; calcining the mixture at a temperature of 600~800° C.; and milling the calcined mixture for 20~30 hours.

$$(A_{1-x}A'_x)WO_4 \tag{1}$$

wherein A and A' are each independently selected from among transition metals and alkaline earth metals, and x is $0 \le x \le 0.5$.

In the second embodiment, the transition metal may include Cu, Ni, Co, Fe and Mn, and the alkaline earth metal may include Mg and Zn.

A third embodiment of the present invention provides a method of producing a visible light-responsive photocatalyst composition, comprising a process of preparing a compound represented by Formula 1 below, the process comprising: dissolving any one selected from among metal nitrides and metal chlorides and any one selected from among sodium tungstate ($Na_2WO_4 \cdot 2H_2O$) and ammonium para tungstate ($H_{42}N_{10}O_{42}W_{12}$-$xH_2O$) in distilled water such that a molar ratio thereof is appropriate to form a mixed solution; adjusting acidity of the mixed solution; hydrothermally synthesizing the mixed solution at a temperature of 120~180° C. to form a slurry; and centrifugally separating the slurry and then drying the separated slurry.

$$(A_{1-x}A'_x)WO_4 \quad (1)$$

wherein A and A' are each independently selected from among transition metals and alkaline earth metals, and x is 0≤x≤0.5.

A fourth embodiment of the present invention provides a method of producing a visible light-responsive photocatalyst composition, comprising a process of preparing a compound represented by Formula 1 below, the process comprising: dissolving any one selected from among metal nitrides and metal chlorides and any one selected from among sodium tungstate ($Na_2WO_4.2H_2O$) and ammonium para tungstate ($H_{42}N_{10}O_{42}W_{12}-xH_2O$) in distilled water such that a molar ratio thereof is appropriate to form a mixed solution; adjusting the acidity of the mixed solution; heating the mixed solution to a temperature of 40~90° C. in air to form a slurry; centrifugally separating the slurry and then drying the separated slurry; and heat-treating the dried slurry at a temperature of 350~400° C.

$$(A_{1-x}A'_x)WO_4 \quad (1)$$

wherein A and A' are each independently selected from among transition metals and alkaline earth metals, and x is 0≤x≤0.5.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Hereinafter, preferred embodiments of the present invention will be described in detail with reference to the attached drawings The visible light-responsive photocatalyst composition of the present invention includes a compound represented by Formula 1 below:

$$(A_{1-x}A'_x)WO_4 \quad (1)$$

wherein A and A' are each independently selected from among transition metals and alkaline earth metals, and x is 0≤x≤0.5.

It is preferred in the adjustment of the band gap energy of the compound represented by Formula 1 above that the transition metal be selected from among Cu, Ni, Co, Fe and Mn, and that the alkaline earth metal be Mg or Zn.

The compound, represented by Formula 1 above, may have a band gap energy of 3.0 eV or less. Since the compound, represented by Formula 1 above, has a band gap energy smaller than that of titanium dioxide ($TiO_2$), when the compound is irradiated with visible light, the electrons in the compound are transited from a valence band to a conduction band even in a visible light region having lower energy than an ultraviolet light region, and simultaneously, the electrons and holes formed in this procedure participate in an oxidation-reduction reaction, thereby causing a decomposition reaction.

Figure 1:
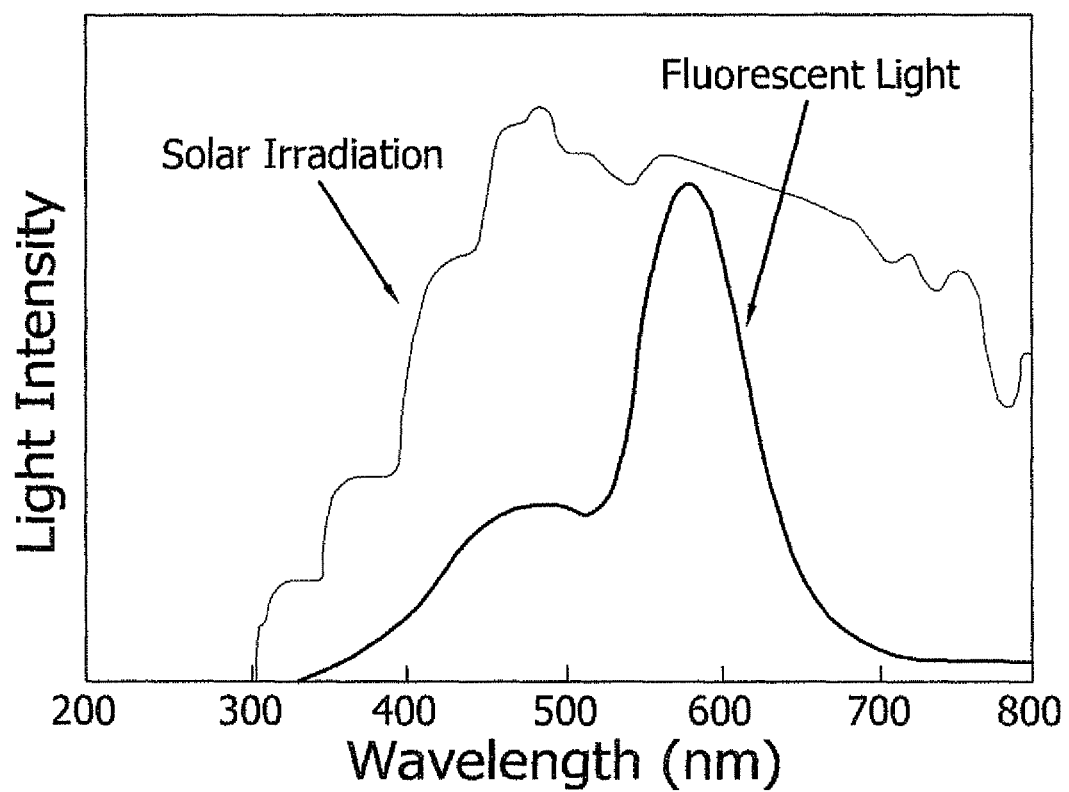
FIG. 1 is a graph showing spectra of solar light and fluorescent light used indoors.
Figure 2:
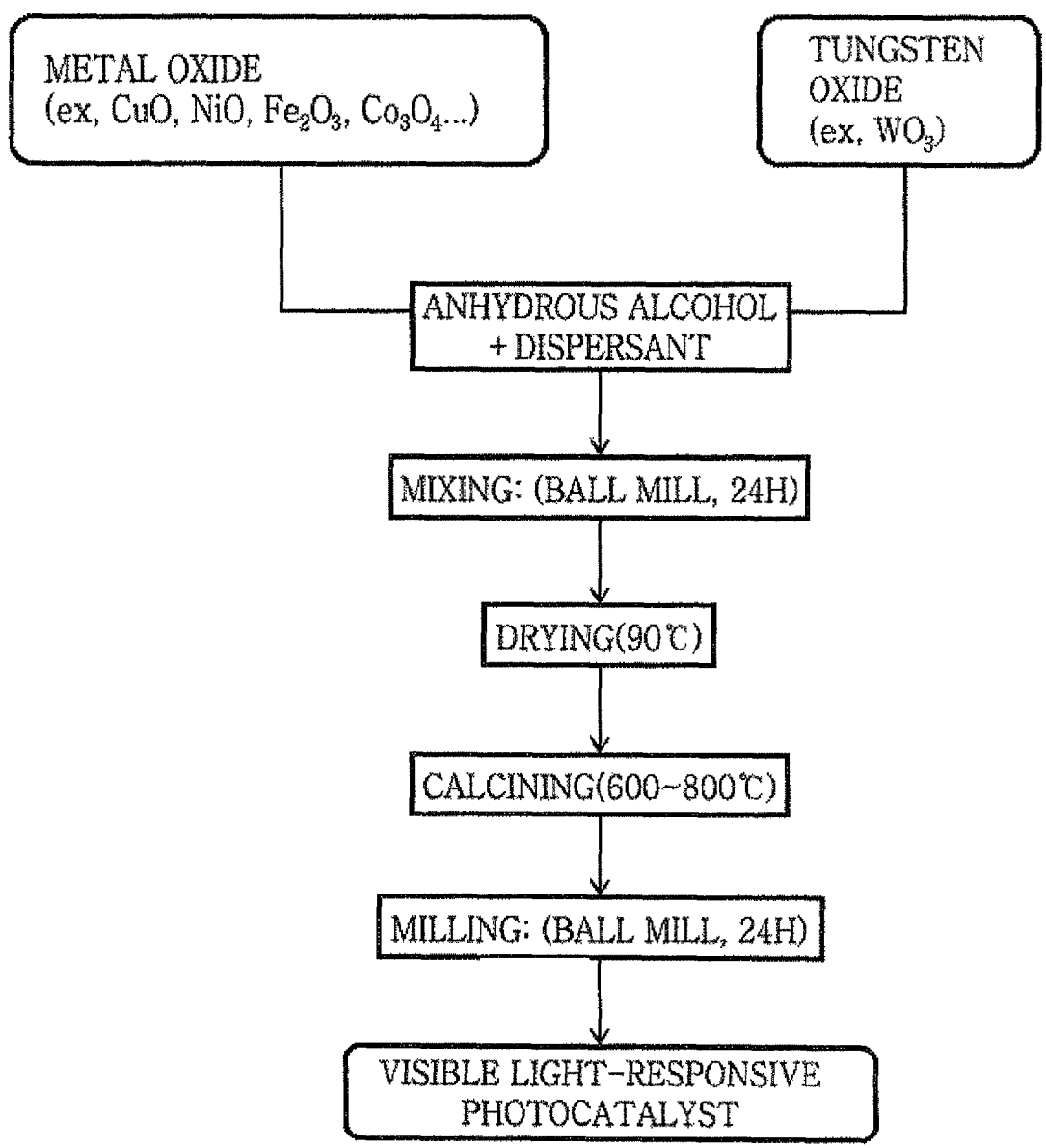
FIG. 2 is a flowchart showing a method of preparing a compound, represented by Formula 1, using a solid phase method according to the present invention.
Figure 3:
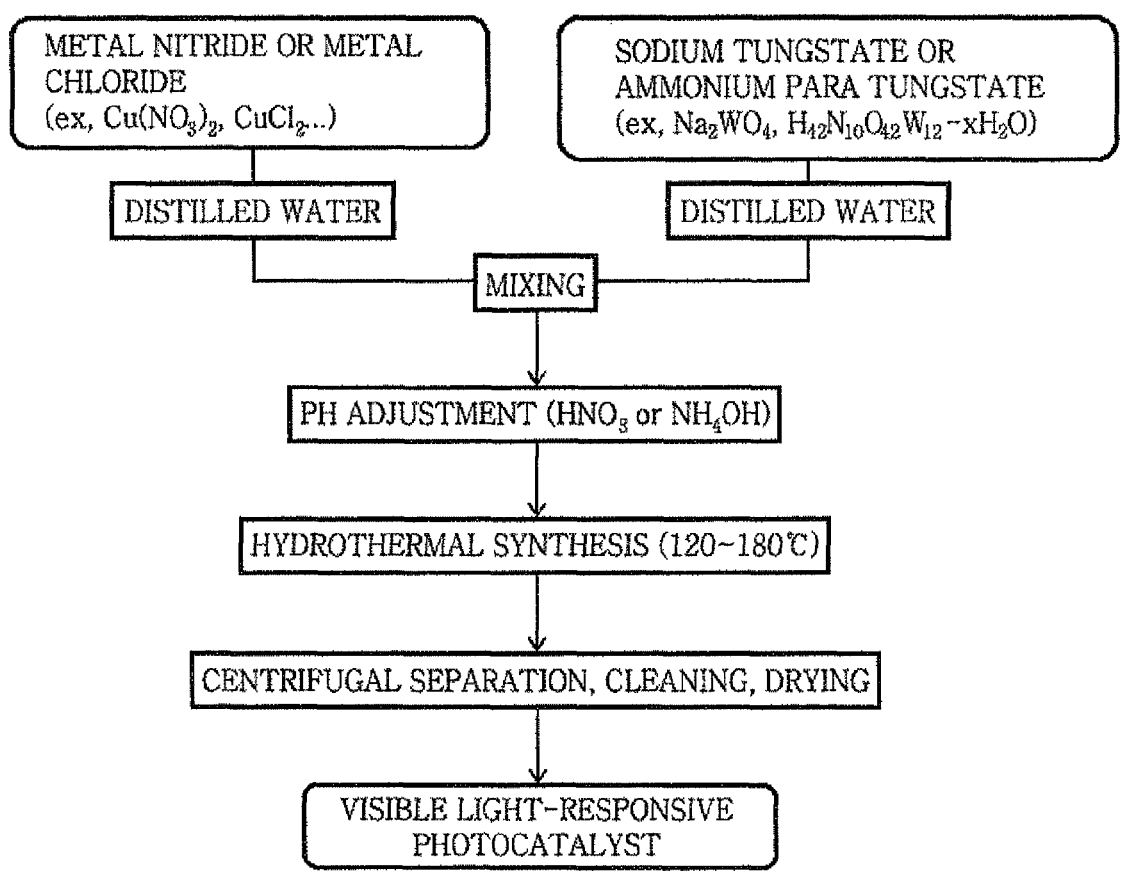
FIG. 3 is a flowchart showing a method of preparing a compound, represented by Formula 1, using a hydrothermal synthesis method according to the present invention.
Figure 4:
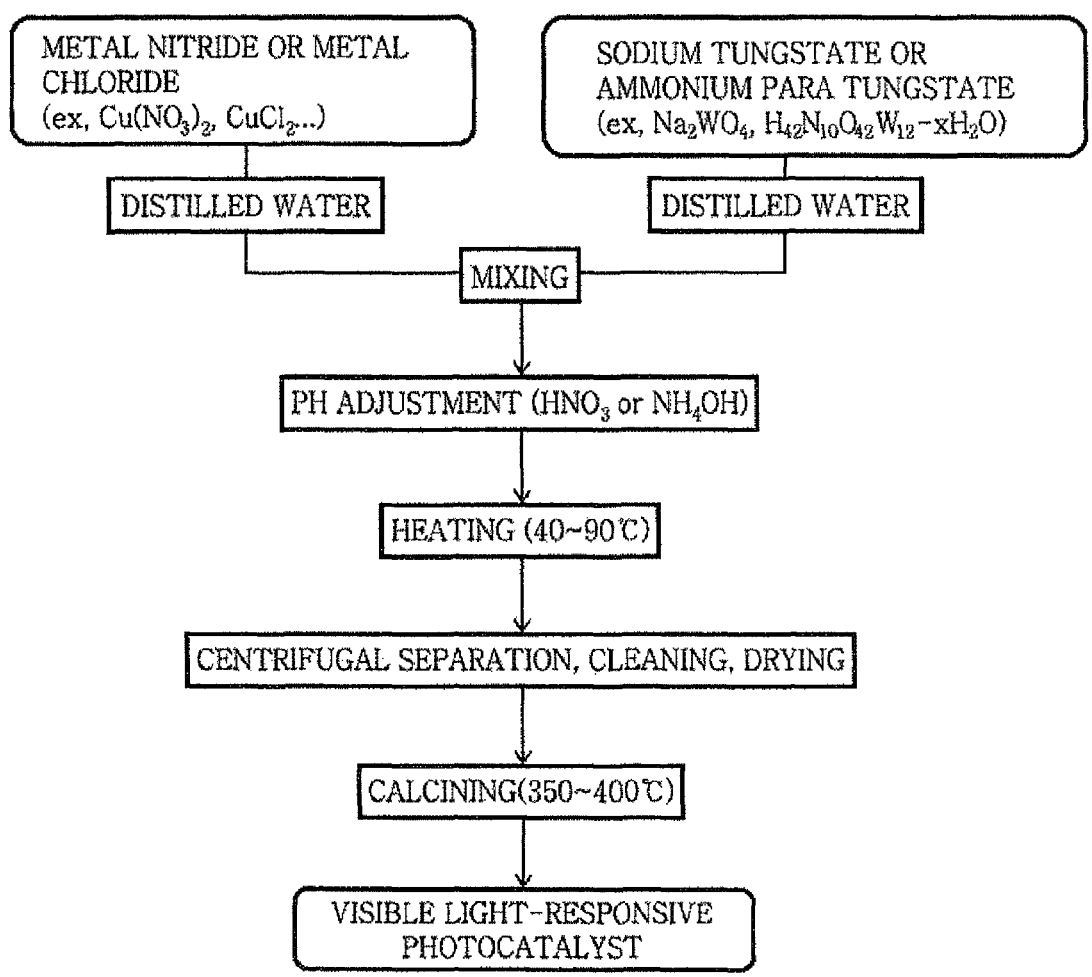
FIG. 4 is a flowchart showing a method of preparing a compound, represented by Formula 1, using a precipitation method according to the present invention.

Meanwhile, FIG. 1 is a graph showing the spectra of solar light and fluorescent light used indoors. From FIG. 1, it can be seen that the wavelength range of fluorescent light includes that of visible light in solar light.

The compound represented by Formula 1 above may be prepared using a solid phase method and a liquid phase method, but the present invention is not limited thereto. First, a method of preparing a compound, represented by Formula 1 below, using a solid method, may include: mixing a transition metal oxide and an alkaline earth metal oxide with a tungsten oxide such that the molar ratio of (A+A'):W is 1~3:1~3; calcining the mixture at a temperature of 600~800° C.; and milling the calcined mixture for 20~30 hours.

$$(A_{1-x}A'_x)WO_4 \quad (1)$$

wherein A and A' are each independently selected from among transition is metals and alkaline earth metals, and x is 0≤x≤0.5.

In this case, the prepared compound may have a particle size of 0.6~1 μm.

In the present invention, it is preferred that the photocatalyst be designed such that the surface thereof is large in order to efficiently use light and to increase the adsorptivity of the photocatalyst to harmful organic substances. Further, since most visible light-responsive photocatalyst powders prepared using the solid phase method have a large particle size and an amorphous shape, it is preferred that the visible light-responsive photocatalyst powder be prepared to have a particle size of 0.6~1 μm through a milling process.

Further, in the present invention, powder having a particle size of 40~110 nm may be prepared in order to increase the specific surface area of the compound represented by Formula 1 above.

For example, a method of preparing the compound, represented by Formula 1 above, using a hydrothermal synthesis method, may include: dissolving any one selected from among metal nitrides and metal chlorides and any one selected from among sodium tungstate ($Na_2WO_4.2H_2O$) and ammonium para tungstate ($H_{42}N_{10}O_{42}W_{12}-xH_2O$) in distilled water such that the molar ratio thereof is appropriate to form a mixed solution; adjusting the acidity of the mixed solution; hydrothermally synthesizing the mixed solution at a temperature of 120~180° C. to form a slurry; and centrifugally separating the slurry and then drying the separated slurry.

In addition, a method of preparing the compound, represented by Formula 1 above, using a precipitation method, may include: dissolving any one selected from among metal nitrides and metal chlorides and any one selected from among sodium tungstate ($Na_2WO_4.2H_2O$) and ammonium para tungstate ($H_{42}N_{10}O_{42}W_{12}-xH_2O$) in distilled water such that the molar ratio thereof is appropriate to form a mixed solution; adjusting the acidity of the mixed solution; heating the mixed solution to a temperature of 40~90° C. in air to form a slurry; centrifugally separating the slurry and then drying the separated slurry; and heat-treating the dried slurry at a temperature of 350~400° C.

The prepared compound, represented by Formula 1 above, may be supported with one or more co-catalysts selected from among NiOx, Pt and $RuO_2$. In this case, considering that the specific surface area of the compound is decreased when the co-catalyst is excessively supported on the compound, the photocatalyst composition of the present invention may further include the co-catalyst such that the amount thereof ranges from 0.1 to 5 wt %, based on the amount of the compound represented by Formula 1 above.

The above mentioned photocatalyst composition of the present invention can be used to decompose various harmful materials, such as phenols, dyes, and the like, in a liquid phase. For example, harmful materials can be decomposed by providing a harmful material solution including photocatalyst powder and then applying light, including visible light, to the solution using a fluorescent lamp, a halogen lamp, a Xenon lamp, solar light, and the like.

In addition, harmful materials may also be decomposed using a method of applying photocatalyst powder on a substrate. Further, acetaldehyde, bad smelling materials and the like may be decomposed in a gas phase using various methods, such as a method of applying a photocatalyst powder on a substrate, a method of coating a reaction container with photocatalyst powder, etc.

The visible light-responsive photocatalyst composition produced according to the present invention is advantageous in that it is chemically stable, does not changed before or after a photocatalytic reaction, and can be effectively used to decompose harmful liquid or gaseous materials.

Hereinafter, the present invention will be described in more detail with reference to the following Examples, but the scope of the present invention is not limited thereto.

Examples 1 to 34 and Comparative Example 1

Visible light-responsive photocatalyst compositions were produced as shown in Table 1. The processes of producing the visible light-responsive photocatalyst compositions and the results of the evaluation of the liquid-phase and gas-phase decomposition characteristics of the visible light-responsive photocatalyst compositions are described as follows.

(1) Solid Phase Method

As starting materials, one or more metal oxides, having a purity of 99.9%, selected from among CuO, NiO, $CO_3O_4$, $Fe_2O_3$, $Mn_2O_3$, ZnO and MgO, which correspond to A and A', and tungsten oxide ($WO_3$) were weighed such that the molar ratio of (A+A'):W was 1:1, they were put into a polyethylene bottle such that the weight ratio of anhydrous ethanol:powder was 1:1, and then 1 part by weight of a dispersant was added thereto in order to smoothly mix them, so as to prepare a sample. The prepared sample was wet-mixed with zirconia balls for 12~24 hours to form a slurry. The slurry was heated to a temperature of 100° C. in an oven to remove a solvent therefrom, put into an alumina crucible, and then calcined at a temperature of 600~800° C. for 2 hours. The calcined slurry was milled for 24 hours to form powder.

Thereafter, the powder was dried in an oven at a temperature of 100° C., and then the light absorption characteristics and photocatalytic decomposition characteristics were measured using the dried powder.

(2) Liquid Phase Method

As starting materials, any one, having a purity of 99~99.9%, selected from among metal nitrides ($Cu(NO_3)_2 \cdot 2H_2O_7$ $Ni(NO_3)_2 \cdot 6H_2O$, $Co(NO_3)_2 \cdot 6H_2O$, $Fe(NO_3)_3 \cdot 9H_2O$, $Mn(NO_3)_2 \cdot 4H_2O$) and metal chlorides ($CuCl_2 \cdot 2H_2O$, $NiCl_2 \cdot 6H_2O$, $CoCl_2$, $FeCl_2 \cdot 4H_2O$, $MnCl_2 \cdot 4H_2O$) and any one selected from among sodium tungstate ($Na_2WO_4 \cdot 2H_2O$) and ammonium para tungstate ($H_{42}N_{10}O_{42}W_{12}$-$xH_2O$) were weighed such that the molar ratio of (A+A'):W was 1:1, and then they were dissolved in distilled water and mixed with each other to form a mixed solution. Subsequently, the acidity of the mixed solution was adjusted using aqueous ammonia, and then the mixed solution was heated to an appropriate temperature or hydrothermally synthesized using an autoclave, so as to obtain a slurry. In this case, the heating temperature was 50~90° C., the hydrothermal synthesis temperature was 120~180° C., and the reaction time was 12~24 hours. Thereafter, the obtained slurry was centrifugally separated and then freeze-dried or dried in an oven at a temperature of 100° C.

(3) Liquid Phase Decomposition 0.3 g of visible light-responsive photocatalyst powder was added to 100 ml of a Rhodamine B (47.9 μmol) solution in a quartz glass container (120 ml), and then stirred in the dark for 30 minutes in order to obtain an adsorption-desorption equilibrium state, so as to form a mixed solution. Subsequently, pure visible light was applied to the mixed solution using a 300 W Xenon lamp (model: Ashahi Max-302) and a 420 nm UV cut-off filter, and then the mixed solution, irradiated with visible light, was sampled at regular intervals, the powder remaining in the mixed solution was removed through a centrifugal separation process, and then the decomposition rate of Rhodamine B was measured through UV-vis spectroscopy.

(4) Gas Phase Decomposition

An acrylic resin box (length: 10 cm, width: 10 cm, height: 10 cm) was used to conduct gas phase composition. The acrylic resin box was sealed to prevent gas ($CO_2$) from leaking and was provided on one side thereof with a quartz glass container to apply light thereto. 0.01 ml of acetaldehyde was put into the acrylic resin box, and then light was applied thereto to form $CO_2$. The amount Of $CO_2$ that was formed was quantitatively determined using gas chromatography. The decomposition rate (%) of acetaldehyde was calculated based on the amount of $CO_2$ formed in reality to the amount of $CO_2$ formed when acetaldehyde was decomposed to 100% in theory.

The light adsorption characteristics (band gap energy), particle sizes, and photocatalytic decomposition characteristics of the photocatalyst powder produced using the compositions in Examples 1 to 22 and Comparative Example 1 through hydrothermal synthesis methods using a solid phase method and a liquid phase method are given in Table 1.

TABLE 1

| | $(A_{1-x}A'_x)WO_4$ | | | Synthesis method | Band gap (eV) | Particle size of powder | Liquid phase decomposition (200 W halogen lamp, >420 nm) Decomposition rate (%) of Rhodamine B after 3 hours | Gas phase decomposition (200 W halogen lamp, >420 nm) Decomposition rate (%) of acetaldehyde after 3 hours |
|---|---|---|---|---|---|---|---|---|
| Class. | x | A | A' | | | | | |
| Exp. 1 | 0 | Cu | — | S.P. method | 2.3 | 0.8 μm | 15 | 10 |
| Exp. 2 | | | | L.P. method | | 50 nm | 30 | 20 |

TABLE 1-continued

| Class. | $(A_{1-x}A'_x)WO_4$ x | A | A' | Synthesis method | Band gap (eV) | Particle size of powder | Liquid phase decomposition (200 W halogen lamp, >420 nm) Decomposition rate (%) of Rhodamine B after 3 hours | Gas phase decomposition (200 W halogen lamp, >420 nm) Decomposition rate (%) of acetaldehyde after 3 hours |
|---|---|---|---|---|---|---|---|---|
| Exp. 3 | 0 | Ni | — | S.P. method | 2.9 | 0.8 μm | 30 | 13 |
| Exp. 4 | | | | L.P. method | | 60 nm | 50 | 25 |
| Exp. 5 | 0 | Co | — | S.P. method | 2.6 | 1 μm | 20 | 13 |
| Exp. 6 | | | | L.P. method | | 100 nm | 35 | 28 |
| Exp. 7 | 0 | Fe | — | S.P. method | 1.6 | 0.6 μm | 40 | 25 |
| Exp. 8 | | | | L.P. method | | 40 nm | 70 | 40 |
| Exp. 9 | 0 | Mn | — | S.P. method | 2.5 | 0.9 μm | 15 | 5 |
| Exp. 10 | | | | L.P. method | | 110 nm | 25 | 10 |
| Exp. 11 | 0.1 | Fe | Cu | S.P. method | 1.9 | 0.6 μm | 45 | 22 |
| Exp. 12 | | | | L.P. method | | 50 nm | 72 | 30 |
| Exp. 13 | 0.1 | Fe | Ni | S.P. method | 2.2 | 0.6 μm | 45 | 30 |
| Exp. 14 | | | | L.P. method | | 70 nm | 75 | 44 |
| Exp. 15 | 0.1 | Fe | Co | S.P. method | 2.3 | 0.8 μm | 42 | 28 |
| Exp. 16 | | | | L.P. method | | 90 nm | 73 | 41 |
| Exp. 17 | 0.1 | Fe | Mg | S.P. method | 2.6 | 0.9 μm | 50 | 30 |
| Exp. 18 | | | | L.P. method | | 120 nm | 75 | 45 |
| Exp. 19 | 0.1 | Fe | Zn | S.P. method | 3.0 | 1 μm | 20 | 15 |
| Exp. 20 | | | | L.P. method | | 500 nm | 52 | 33 |
| Exp. 21 | 0.2 | Fe | Ni | S.P. method | 2.5 | 0.8 μm | 50 | 30 |
| Exp. 22 | | | | L.P. method | | 70 nm | 80 | 50 |
| Exp. 23 | 0.2 | Fe | Mn | S.P. method | 2.5 | 0.9 μm | 35 | 8 |
| Exp. 24 | | | | L.P. method | | 100 nm | 70 | 11 |
| Exp. 25 | 0.3 | Fe | Ni | S.P. method | 2.7 | 0.8 μm | 48 | 29 |
| Exp. 26 | | | | L.P. method | | 70 nm | 78 | 48 |
| Exp. 27 | 0.3 | Fe | Co | S.P. method | 2.5 | 0.9 μm | 40 | 22 |
| Exp. 28 | | | | L.P. method | | 90 nm | 68 | 35 |
| Exp. 29 | 0.3 | Ni | Co | S.P. method | 2.8 | 0.9 μm | 33 | 15 |
| Exp. 30 | | | | L.P. method | | 90 nm | 55 | 20 |
| Exp. 31 | 0.3 | Fe | Mg | S.P. method | 3.0 | 0.9 μm | 15 | 7 |
| Exp. 32 | | | | L.P. method | | 150 nm | 20 | 11 |
| Exp. 33 | 0.5 | Fe | Cu | S.P. method | 2.2 | 0.7 μm | 35 | 20 |
| Exp. 34 | | | | L.P. method | | 50 nm | 68 | 28 |
| Comp. Exp. 1 | | $TiO_2$ (P25) | — | | 3.2 | 50 nm | 3 | 2 |

As shown in Table 1, compared to TiO$_2$ (P25) powder, known to have excellent activity in an ultraviolet region, all the tungstate-based visible light-responsive photocatalyst powders, represented by Formula 1 above, exhibited high activity in liquid-phase decomposition and gas-phase decomposition when visible light having a wavelength of 420 nm or more was applied thereto. In particular, NiWO$_4$ and FeWO$_4$ exhibited the highest decomposition rates of Rhodamine B and acetaldehyde, respectively. Further, the decomposition rates of the powders produced using a liquid phase method were about 50~60% higher than those of the powders produced using a solid phase method. The reason is that the particle sizes of the powders produced using a liquid phase method are much smaller than those of the powders produced using a solid phase method, and the specific surface areas thereof are increased, and thus the ability of the powders to adsorb Rhodamine B molecules or acetaldehyde molecules is increased.

Further, it can be seen that the powders in which FeWO$_4$ is partially substituted with other different transition metals on the Fe site thereof have better decomposition characteristics than FeWO$_4$ powder, and, as the amount of the substituted transition metals increases, the decomposition characteristics thereof also increase.

Therefore, it is determined that the tungstate-based compound, represented by Formula 1 above, can effectively use solar light because it has a low band gap energy, and exhibits high activity in liquid phase decomposition and gas phase decomposition, and thus is highly useful as a visible light-responsive photocatalyst composition.

Examples 35 to 38

The tungstate-based powder may be supported with a Co-Catalyst, such as NiOx, Pt, or RuO$_2$. The decomposition rates of Rhodamine B and acetaldehyde using the tungstate-based powders of Examples 1, 2, 7 and 8 supported with NiOx are given in Table 2.

TABLE 2

| Class. | NiO$x$ Loading | Synthesis method | Particle size of powder | Liquid phase decomposition (200 W halogen lamp, >420 nm) Decomposition rate (%) of Rhodamine B after 3 hours | Gas phase decomposition (200 W halogen lamp, >420 nm) Decomposition rate (%) of acetaldehyde after 3 hours |
|---|---|---|---|---|---|
| Exp. 35 | 1 wt % NiO$x$ based on CuWO$_4$ | S.P. method | 0.8 μm | 65 | 30 |
| Exp. 36 | | L.P. method | 50 nm | 80 | 45 |
| Exp. 37 | 1 wt % NiO$x$ based on FeWO$_4$ | S.P. method | 0.6 μm | 65 | 50 |
| Exp. 38 | | L.P. method | 40 nm | 85 | 70 |

From Table 2, it can be seen that the decomposition rates of Rhodamine B and acetaldehyde using the tungstate-based powders supported with the Co-catalyst are increased, compared to the pure tungstate-based powders.

In conclusion, the present invention provides a tungstate-based visible light-responsive photocatalyst composition, which includes a compound having a low band gap energy of 3.0 eV or less in order to efficiently use visible light, accounting for a majority of solar radiation, which can be used to decompose harmful liquid materials, such as phenols and dyes, and harmful gaseous materials, such as acetaldehyde and formaldehyde, at a high decomposition rate, and which is chemically stable after a photocatalytic reaction, a method of producing the photocatalyst composition, and a method of decomposing harmful materials using the photocatalyst composition. Therefore, in the future, it is expected that the present invention can be applied to solve various environmental problems and energy problems.

As described above, the present invention provides a visible light-responsive photocatalyst composition that can decompose volatile organic compounds or harmful organic matter, which cause sick house syndrome, even indoors, because it can be activated by visible light outdoors and can also respond to light emitted from interior lamps, such as fluorescent lamps, etc.

Further, the present invention provides a method of preparing a visible light-responsive photocatalyst composition that can be activated by visible light and fluorescent light.

Furthermore, the present invention provides a visible light-responsive photocatalyst composition which is chemically stable, does not change before or after a photocatalytic reaction, and can be effectively used to decompose harmful liquid or gaseous materials, and a method of preparing the photocatalyst composition.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A visible light-responsive photocatalyst composition, comprising a compound represented by Formula 1 below and having a bandgap energy of 3.0 eV or less:

$$(A_{1-x}A'_x)WO_4 \tag{1}$$

wherein A and A' are each independently selected from Cu, Ni, Co, and Fe, and x is 0.1≤x≤0.5; and further comprising NiO$_x$, such that an amount thereof ranges from 0.1 to 5 wt %, based on an amount of the compound represented by Formula 1 above.

* * * * *